United States Patent
Qi et al.

(10) Patent No.: US 12,535,939 B2
(45) Date of Patent: Jan. 27, 2026

(54) METHOD AND APPARATUS FOR CONTENT CREATION

(71) Applicant: Beijing Zitiao Network Technology Co., Ltd., Beijing (CN)

(72) Inventors: Junyuan Qi, Beijing (CN); Xin Zhong, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/093,236

(22) Filed: Mar. 27, 2025

(65) Prior Publication Data
US 2025/0377766 A1 Dec. 11, 2025

Related U.S. Application Data

(63) Continuation of application No. PCT/CN2024/097862, filed on Jun. 6, 2024.

(51) Int. Cl.
*G06F 3/0484* (2022.01)
*G06F 3/04817* (2022.01)
*G06F 40/186* (2020.01)
*G06N 3/0475* (2023.01)

(52) U.S. Cl.
CPC ........ *G06F 3/0484* (2013.01); *G06F 3/04817* (2013.01); *G06F 40/186* (2020.01); *G06N 3/0475* (2023.01)

(58) Field of Classification Search
CPC ........ G06F 9/453; G06F 40/56; G06F 3/0484; G06F 3/04817; G06F 40/186; G06F 16/90332; G06F 16/90324; G06F 40/58; G06N 3/0475; G06N 20/00; G06N 3/0464
See application file for complete search history.

(56) References Cited

U.S. PATENT DOCUMENTS

| | | | |
|---|---|---|---|
| 2024/0127007 A1* | 4/2024 | Liu | G06F 9/54 |
| 2024/0129601 A1 | 4/2024 | Brdiczka et al. | |
| 2024/0256841 A1* | 8/2024 | Abrams | G06F 16/9538 |
| 2024/0377932 A1* | 11/2024 | Zhao | G06F 40/30 |
| 2025/0068833 A1* | 2/2025 | Wong | G06F 40/174 |
| 2025/0077237 A1* | 3/2025 | Sachindran | G06N 3/08 |
| 2025/0110618 A1* | 4/2025 | Kumar | G06F 40/30 |
| 2025/0200279 A1* | 6/2025 | Lundberg | G06F 9/453 |

FOREIGN PATENT DOCUMENTS

| | | | | |
|---|---|---|---|---|
| CN | 117170558 A | 12/2023 | | |
| CN | 117235214 A | 12/2023 | | |
| CN | 117671067 A | 3/2024 | | |
| CN | 117714784 A | 3/2024 | | |
| WO | WO-2025075920 A1 * | 4/2025 | ............. | G06N 3/047 |

* cited by examiner

*Primary Examiner* — Nicholas Ulrich
(74) *Attorney, Agent, or Firm* — BakerHostetler

(57) ABSTRACT

Embodiments of the present disclosure provide a method and apparatus for content creation, an electronic device, a medium, and a computer program product. The method includes: displaying, during execution of an editing operation by a user within a target application, an interface element of a content creation tool for interacting with a generative model; obtaining, based on a user prompt received on the interface element, answer content generated by the generative model; and inserting the answer content into the target application.

20 Claims, 9 Drawing Sheets

METHOD AND APPARATUS FOR CONTENT CREATION

CROSS-REFERENCE TO RELATED APPLICATION(S)

The application is a continuation of PCT International Application No. PCT/CN2024/097862, filed on Jun. 6, 2024, the disclosures of which is hereby incorporated by reference in its entirety.

FIELD

Embodiments of the present disclosure relate to the field of computer technologies, and more particularly, to a method and an apparatus for content creation, an electronic device, a medium, and a computer program product.

BACKGROUND

Artificial intelligence-generated content (AIGC) refers to any content created or generated by an artificial intelligence system under human guidance or involvement. With advancements in natural language processing (NLP), machine learning, and deep learning algorithms, artificial intelligence is now capable of generating various types of content, including text, images, videos, music, etc.

SUMMARY

In view of this, a method and an apparatus for content creation, an electronic device, a computer-readable storage medium, and a program product are provided, which can help a user interact with an AI system more conveniently to assist the user in content creation.

According to a first aspect of the present disclosure, a method for content creation is provided. The method includes: displaying, during execution of an editing operation by a user within a target application, an interface element of a content creation tool for interacting with a generative model; obtaining, based on a user prompt received on the interface element, answer content generated by the generative model; and inserting the answer content into the target application.

According to a second aspect of the present disclosure, an apparatus for content creation is provided. The apparatus includes: a display unit configured to display, during execution of an editing operation by a user within a target application, an interface element of a content creation tool for interacting with a generative model; a content obtaining unit configured to obtain, based on a user prompt received on the interface element, answer content generated by the generative model; and a content insertion unit configured to insert the answer content into the target application.

According to a third aspect of the present disclosure, an electronic device is provided. The electronic device includes: one or more processors; and a memory configured to store one or more programs, where the one or more programs, when executed by the one or more processors, cause the one or more processors to implement the method according to the first aspect of the present disclosure.

According to a fourth aspect of the present disclosure, a computer-readable storage medium is provided. The computer-readable storage medium has a computer program stored thereon, where the computer program, when executed by a processor, causes the method according to the first aspect of the present disclosure to be implemented.

According to a fifth aspect of the present disclosure, a computer program product is provided. The computer program product includes a computer program that, when executed by a processor, causes the method according to the first aspect of the present disclosure to be implemented.

The section Summary is provided to introduce a selection of concepts in a simplified form, which will be further described in the detailed description below. The section Summary is neither intended to identify key features or principal features of the claimed subject matter, nor to limit the scope of the claimed subject matter.

BRIEF DESCRIPTION OF THE DRAWINGS

The above and other objectives, features and advantages of the present disclosure will be more apparent from the more detailed description of exemplary embodiments of the present disclosure with reference to the accompanying drawings, in which like reference numerals generally represent like components in the exemplary embodiments of the present disclosure.

DETAILED DESCRIPTION OF EMBODIMENTS

Figure 1:
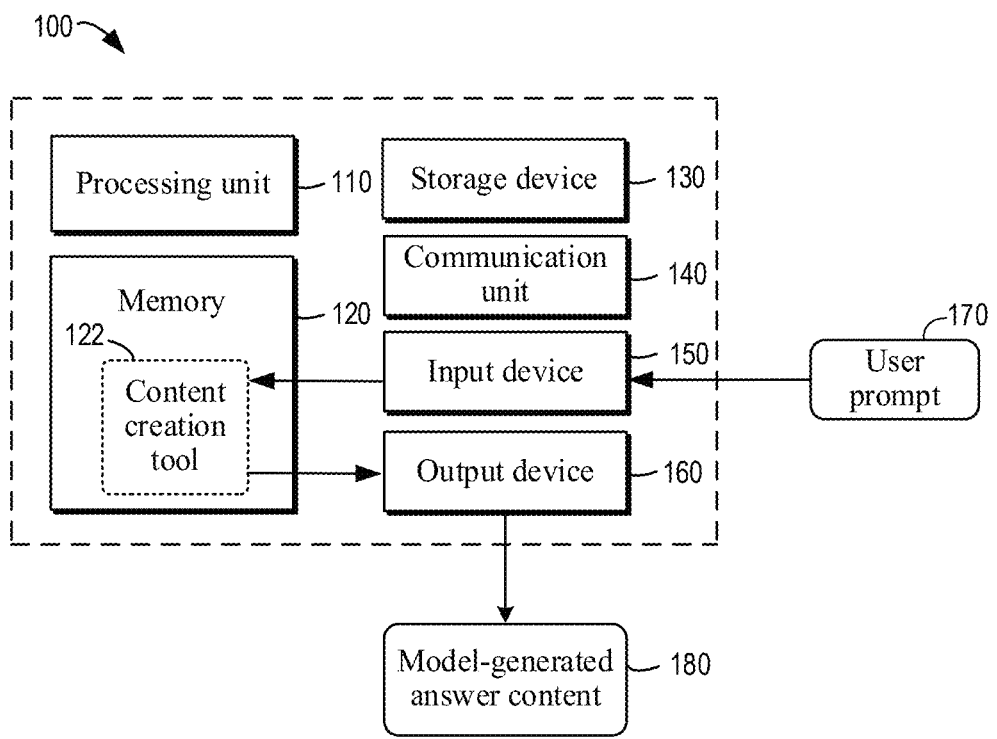
FIG. 1 is a block diagram of a computing device capable of implementing some embodiments of the present disclosure.

It can be understood that before the use of the technical solutions disclosed in the embodiments of the present disclosure, the user shall be informed of the type, range of use, use scenarios, etc., of personal information involved in the present disclosure in an appropriate manner in accordance with the relevant laws and regulations, and the authorization of the user shall be obtained.

The present disclosure will now be set forth with reference to several example implementations. It should be understood that these implementations are set forth only to enable those skilled in the art to better understand and thereby implement the present disclosure, rather than implying any limitation on the scope of the present disclosure.

As used herein, the term "include" and variations thereof are to be construed as open-ended terms meaning "including, but not limited to". The term "based on" should be construed as "at least partially based on". The terms "one implementation" and "an implementation" should be construed as "at least one implementation". The term "another implementation" should be construed as "at least one other implementation". The terms "first", "second", and the like may refer to different objects or the same object. Other explicit and implicit definitions may be included below. It should be noted that any numerical values or numbers used in the present disclosure are exemplary and are in no way intended to limit the scope of the present disclosure.

Traditionally, to enable AI-assisted content creation, a user accesses an AI system via a browser or using a dedicated AI application. The user poses prompts to the AI system, requesting the AI system to generate answer content to assist the user in content creation. The user typically performs content creation in a specific editing application, and therefore needs to switch back and forth between the browser or AI application and the editing application, for example, copying the answer content into the editing application to complete the creation, or copying a segment of text from the editing application to pose questions to the AI system. In addition, the user may expect to obtain answer content of different styles in different editing applications, which requires the user to write relatively complex prompts to the AI system. These problems have brought various inconveniences to users when using AI systems for content creation.

In view of this, the embodiments of the present disclosure provide a content creation tool for interacting with an AI model that can be used across a plurality of editing applications. This tool is deployed on the operating system and associated with the plurality of editing applications. When the user performs an editing operation in a given editing application, the content creation tool can be activated and displayed (e.g., displayed in the form of a floating window overlaid on the current editing application). Upon receiving prompts input by the user in the tool, an answer generated by the AI model is obtained and presented to the user. The user can confirm the insertion of the content in the content creation tool (e.g., by clicking or touching a control on the floating window), thereby inserting the content generated by the AI model into the current editing application as a whole.

The implementation details of the embodiments of the present disclosure are described in detail below with reference to FIG. 1 to FIG. 5.

FIG. 1 is a block diagram of a computing device 100 capable of implementing some embodiments of the present disclosure. It should be understood that the computing device 100 shown in FIG. 1 is merely an example and should not constitute any limitation on the functions and scopes of the implementations described in the present disclosure. As shown in FIG. 1, components of the computing device 100 may include but are not limited to one or more processors or processing units 110, a memory 120, a storage device 130, one or more communication units 140, one or more input devices 150, and one or more output devices 160.

In some implementations, the computing device 100 may be implemented as various user terminals with a computing capability. The user terminals, such as any type of mobile terminal, fixed terminal, or portable terminal, include mobile phones, stations, units, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDA), audio/video players, digital cameras/camcorders, positioning devices, television receivers, radio receivers, e-book devices, game devices, or any combination thereof, including accessories and peripherals of these devices or any combination thereof. It is also predictable that the computing device 100 can support any type of user-oriented interface (such as a "wearable" circuit).

The processing unit 110 may be a physical or virtual processor, and can perform various processing based on a program stored in the memory 120. In a multi-processor system, a plurality of processing units execute computer-executable instructions in parallel, to improve a parallel processing capability of the computing device 100. The processing unit 110 may also be referred to as a central processing unit (CPU), a graphics processing unit (GPU), a microprocessor, a controller, and a microcontroller.

The computing device 100 generally includes a plurality of computer storage media. Such media may be any available media accessible by the computing device 100, including, but not limited to, volatile and non-volatile media and removable and non-removable media. The memory 120 may be a volatile memory (for example, a register, a cache, or a random-access memory (RAM)), a non-volatile memory (for example, a read-only memory (ROM), an electrically erasable programmable read-only memory (EEPROM), or a flash memory), or a specific combination thereof. The memory 120 may include a content creation tool 122 implemented as a program module. The content creation tool 122 may be configured as a program module to perform the method for content creation described herein or implement a corresponding apparatus for content creation. The content creation tool 122 may be accessed and operated by a processing unit 110 to implement a corresponding function.

The storage device 130 may be a removable or non-removable medium, and may include a machine-readable medium, which can be used to store information and/or data and can be accessed in the computing device 100. The computing device 100 may further include other removable/non-removable and volatile/non-volatile storage media. Although not shown in FIG. 1, a disk drive for reading from or writing into removable and non-volatile disks and an optical disc drive for reading from or writing into removable and non-volatile optical discs may be provided. In these cases, each drive may be connected to a bus (not shown) through one or more data medium interfaces.

The communication unit 140 implements communication with another computing device through a communication medium. In addition, functions of the components of the computing device 100 may be implemented by a single computing cluster or a plurality of computing machines, and these computing machines can communicate through a communication connection. Therefore, the computing device 100 may perform operations in a networked environment through a logical connection to one or more other servers, a personal computer (PC), or another general network node.

The input device 150 may be one or a plurality of various input devices, such as a mouse, a keyboard, a trackball, and a speech input device. The output device 160 may be one or more output devices, such as a display, a speaker, and a printer. The computing device 100 may further communicate, through the communication unit 140 as required, with one or more external devices (not shown), for example, a storage device and a display device, with one or more devices enabling a user to interact with the computing device 100, or with any device (for example, a network interface card or a modem) enabling the computing device 100 to communicate with one or more other computing devices. Such communication may be performed through an input/output (I/O) interface (not shown).

In some implementations, in addition to being integrated on a single device, some or all of the components of the computing device 100 may also be disposed in a form of a cloud computing architecture. In the cloud computing architecture, these components may be arranged remotely, and may work together to implement the functions described in the present disclosure. In some implementations, cloud computing provides computing, software, and data access and storage services, which do not require an end user to be aware of a physical location or configuration of a system or hardware providing these services. In various implementations, the cloud computing provides the services over a wide area network (such as the Internet) using an appropriate protocol. For example, cloud computing providers offer applications over the wide area network, which may be accessed through a web browser or any other computing component. Software or components of the cloud computing architecture and corresponding data may be stored on servers at remote locations. Computing resources in a cloud computing environment may be consolidated at a remote data center, or may be decentralized. Cloud computing infrastructures may provide services through a shared data center, even though they appear as a single access point to users. Therefore, the components and functions described herein may be provided from service providers at remote locations by using the cloud computing architecture. Alternatively, the components and functions may be provided from a conventional server, or may be installed directly or otherwise on a client device.

By using the content creation tool 122, the computing device 100 may assist the user in content creation according to a plurality of implementations of the present disclosure. The content creation tool 122 may be implemented at a level of an operating system of the computing device 100 and associated with different editing applications, including but not limited to a text editing application, a picture-and-text application, a video application, etc., so that the content creation tool 122 is invokable in these editing applications. The content creation tool 122 may be configured to provide interaction with an AI system having a generative model, for example, providing a prompt 170 input by the user to the AI system and obtaining answer content generated by the AI system. The content creation tool 122 may further be configured to provide interaction with the user, for example, receiving a user input (for example, a prompt), presenting answer content 180 generated by the AI system to the user, and receiving a user instruction to insert the answer content into the current editing application. In some implementations, the content creation tool 122 may further provide an interface for the user to edit or modify AI-generated content. It should be noted that the AI system may be implemented in a cloud (e.g., a server or a cluster), so that the content creation tool 122 of the computing device 100 accesses the AI system via a network. In some implementations, some AI systems may also be implemented locally on the computing device 100.

Figure 2:
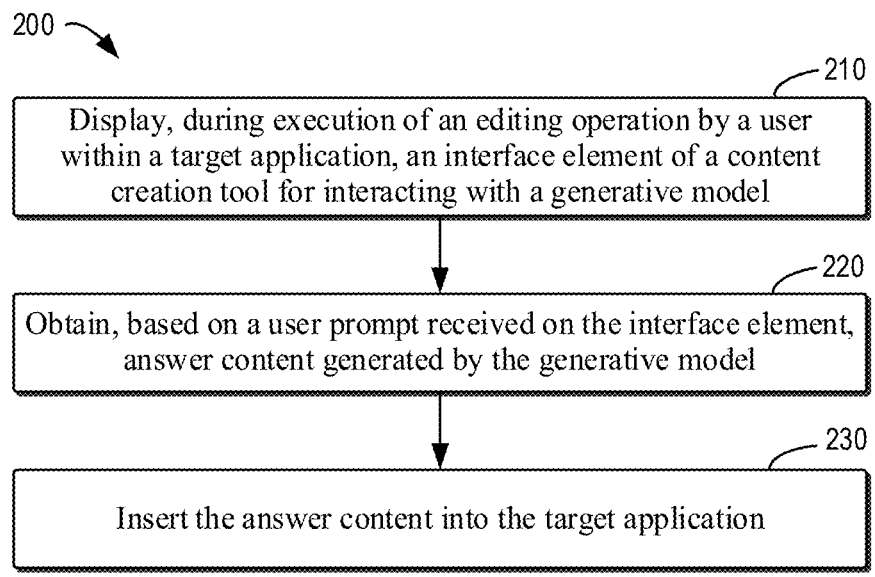
FIG. 2 is a schematic flowchart of a method for content creation according to an embodiment of the present disclosure.

FIG. 2 is a schematic flowchart of a method 200 for content creation according to an embodiment of the present disclosure. The method 200 may be implemented by, for example, the computing device 100 shown in FIG. 1. More specifically, the method 200 may be implemented by the content creation tool 122 of FIG. 1. It should be understood that the method 200 may further include additional actions not shown and/or may omit actions shown, and the scope of the present disclosure is not limited in this regard. For ease of description, the method 200 is described with reference to diagrams of an interface shown in FIG. 3A to FIG. 3F.

As shown in FIG. 2, at block 210, an interface element of a content creation tool for interacting with a generative model is displayed during execution of an editing operation by a user within a target application. Herein, the generative model is a machine learning model that generates new data instances, including but not limited to text, images, videos, audio, or music, based on a probability distribution of training data. The target application is any application that may have an editing function, such as a text editing application, a picture-and-text application, or a video or audio application, and the editing operation may include creating text content, audio content, video content, image content, etc. The details of this embodiment of the present disclosure are described below with creation of text content as an example, but it should be understood that embodiments of the present disclosure are also applicable to other types of creation.

The content creation tool may be deployed at a level of an operating system and associated with a plurality of applications installed in the operating system. For example, the content creation tool may be associated, manually by the user or in a pre-configured manner, with an application having an editing and creation capability. Therefore, when the user performs content creation in these applications, the content creation tool may be invoked or enabled. In some embodiments, the user may further manually set an application range of the content creation tool, for example, restricting the use of the content creation tool in one or more applications, or globally disabling the use of the content creation tool.

Figure 3A:
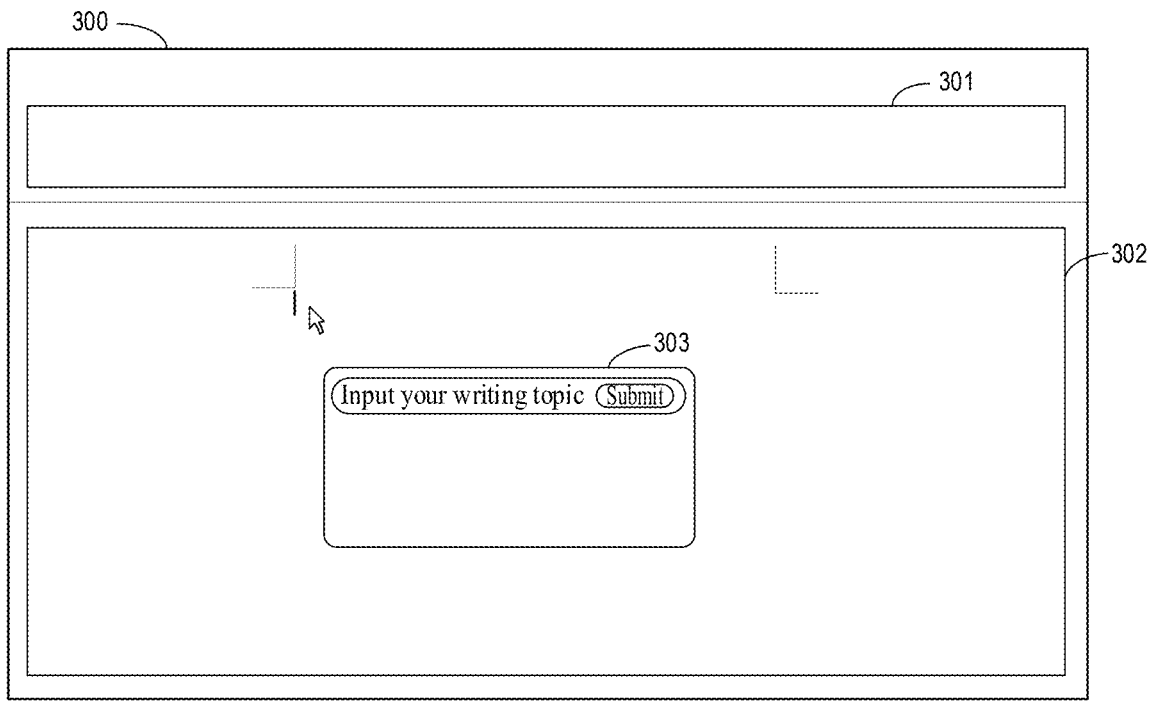
FIG. 3A to FIG. 3C are diagrams of an exemplary user interface of content creation using a content creation tool according to an embodiment of the present disclosure.

FIG. 3A shows an exemplary interface 300 of a target application currently being used by the user. As shown in the figure, the interface 300 includes a toolbar area 301 and an edit area 302 of the target application. It can be understood that the interface 300 shown in FIG. 3A is merely exemplary, and the interface of the target application may be different from the interface 300, for example, it may not necessarily include the toolbar area 301, or may include more interface elements.

When the user intends to enter content (such as text, an image, a video, or audio) in the target application, an interface element 303 of the content creation tool is displayed. The interface element 303 includes at least an input box for inputting a prompt. The user may input a prompt in the input box, expecting to perform content creation with the help of the generative model. In some embodiments, when the user selects existing content within the target application, which indicates that the user may expect to generate information associated with the selected content, the interface element 303 of the content creation tool may be displayed.

Figure 3B:
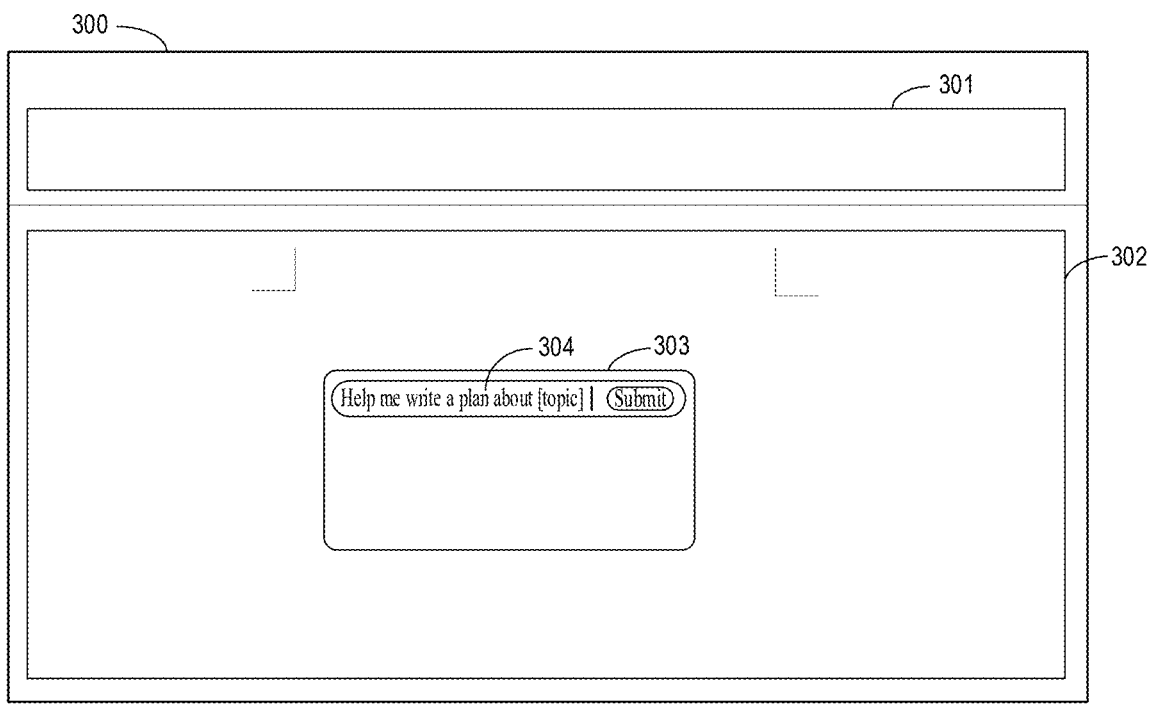

At block 220, answer content generated by the generative model is obtained based on a user prompt received on the interface element. As shown in FIG. 3B, the user may input a prompt 304 and select "Submit", and the prompt in the input box is provided to the generative model, which then generates the answer content.

The content creation tool provides the prompt to the generative model, for example, sending, via a network, to a cluster or an agent running the generative model. The generative model may generate the answer content based on the prompt. In some embodiments, the generative model may also combine contextual or historical information of the user to generate the answer content. Then, the generative model provides the answer content to the content creation tool.

Figure 3C:
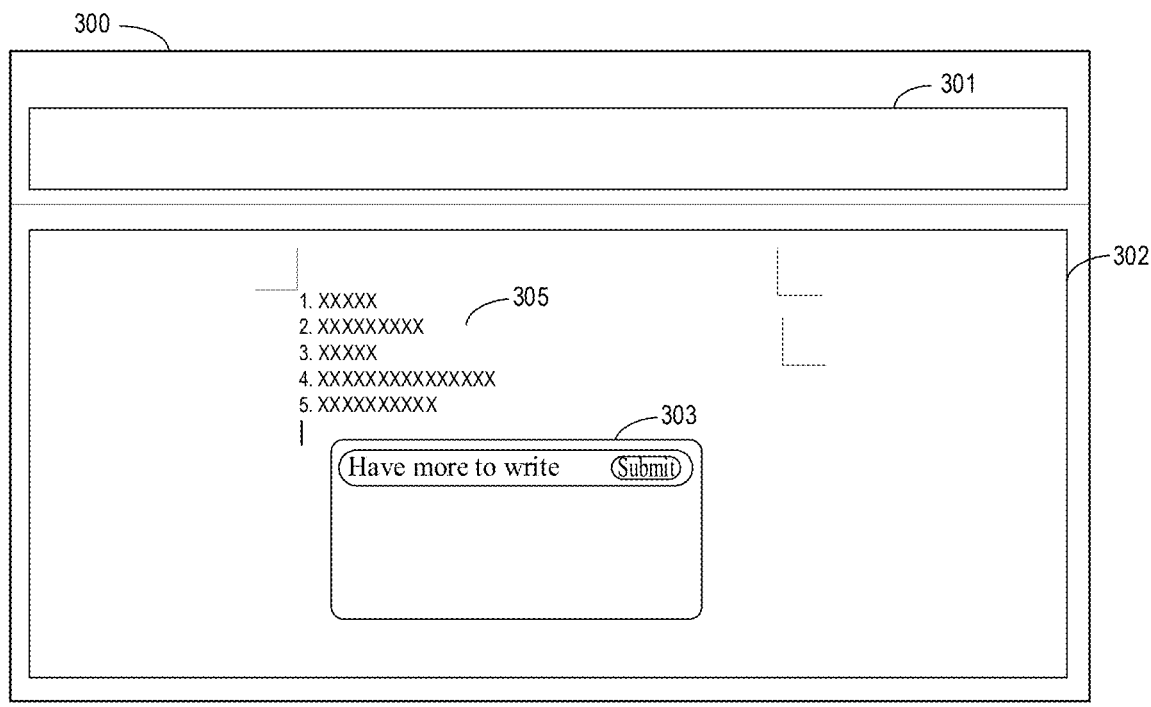

At block 230, the answer content is inserted into the target application. As shown in FIG. 3C, answer content 305 is inserted into the edit area 302 of the target application. In some embodiments, the answer content 305 may be directly inserted into the target application, that is, after the user submits the prompt, the answer content 305 is directly inserted into the target application without other operations. In some embodiments, the user may give an insertion indication to manually insert the answer content into the target application. In some embodiments, the answer content may be displayed in an interface element or other windows, so that the user may preview the answer content and edit the answer content as needed. Then, the user may give the insertion indication, for example, by clicking or touching an insert button on an indication interface, to insert the answer content into the target application. In some embodiments, the answer content may be inserted into a comment box of the target application. For example, when the content creation tool is triggered by selecting existing content, the answer content may be inserted into a comment box corresponding to the selected content.

Figure 4A:
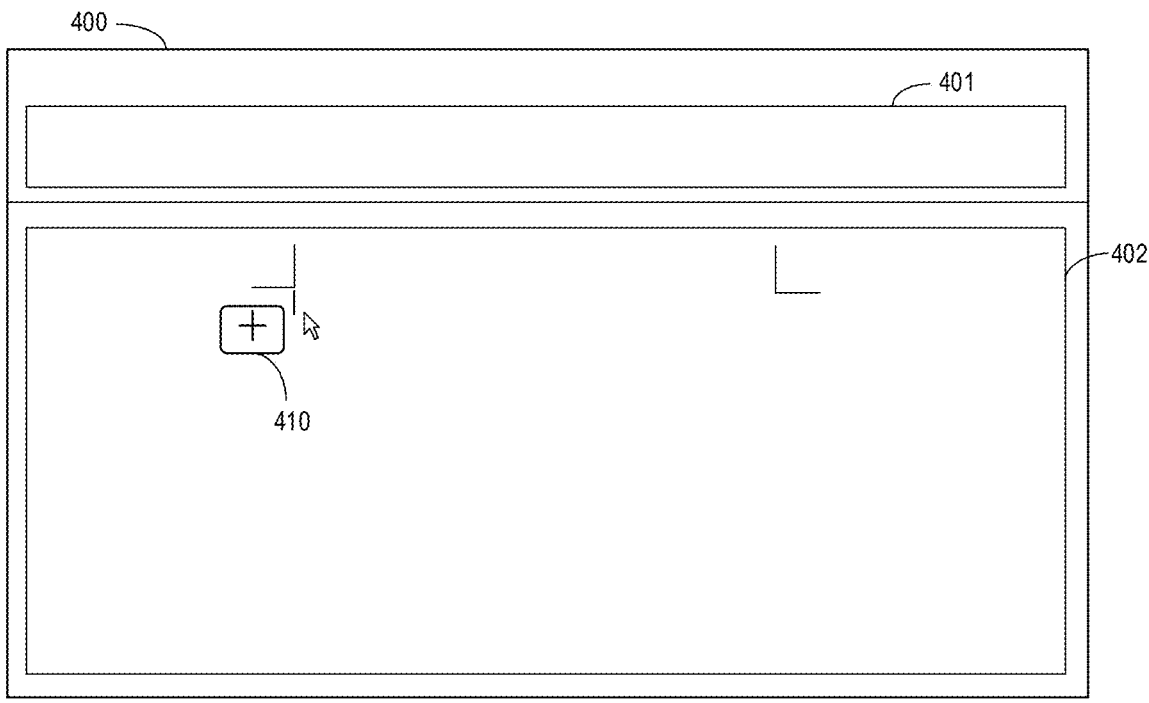
FIG. 4A to FIG. 4I are diagrams of an exemplary user interface of content creation using a content creation tool according to an embodiment of the present disclosure.

More embodiments of the present disclosure are described below in conjunction with diagrams of an exemplary user interface shown in FIG. 4A to FIG. 4I. As shown in FIG. 4A, the interface 400 includes a toolbar area 401 and an edit area 402 of the target application. It can be understood that the interface 400 shown in FIG. 4A is merely exemplary, and the interface of the target application may be different from the interface 400, for example, it may not necessarily include the toolbar area 401, or may include more interface elements.

In some embodiments, if the user is intending to enter text content or media content within the target application, an icon or toolbar for invoking the content creation tool may be displayed. For example, in response to the user activating the input box in the target application, an icon 410 for invoking the content creation tool is displayed for the user to select to trigger for use. Alternatively, the content creation tool may be loaded into the toolbar 401, for the user to manually select to trigger for use. Additionally or alternatively, if the user selects text or media content within the target application, which indicates that the user may want to query or generate related content, the icon for invoking the content creation tool or toolbar 410 may also be displayed in this case.

Figure 4B:
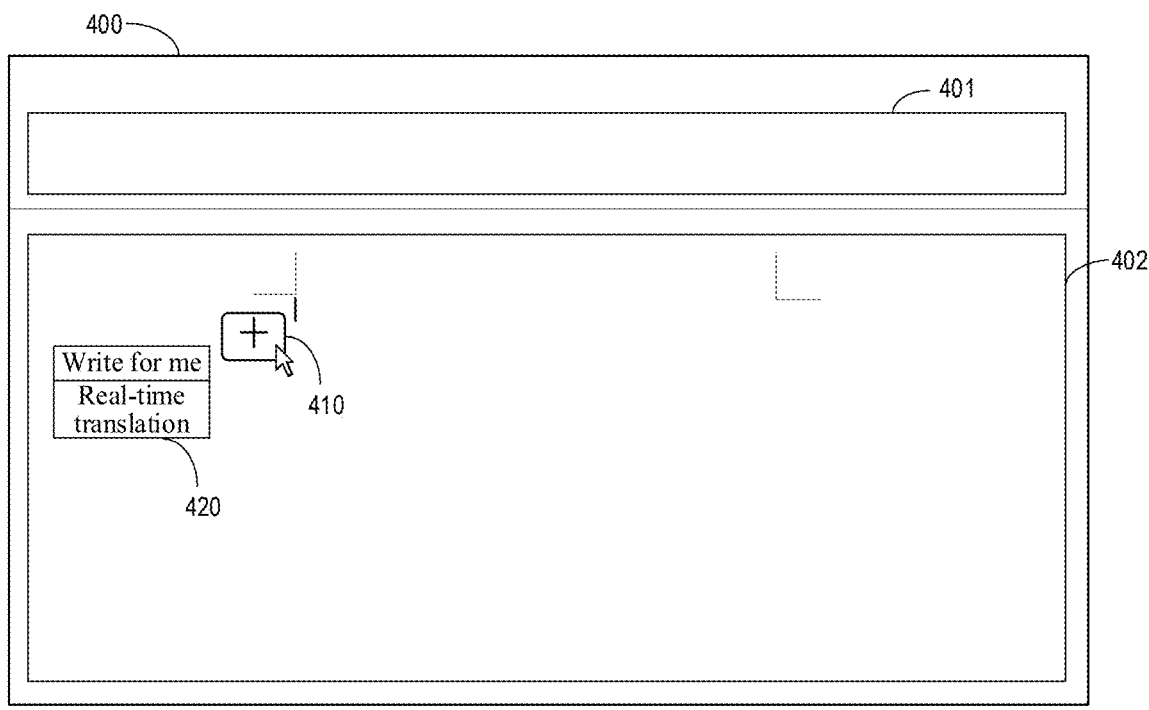

In response to the user selecting the icon 410, one or more functional menu items of the content creation tool are displayed. As shown in FIG. 4B, when the user clicks, touches, or hovers the curse over the icon 410, a "Write for me" or "Real-time translation" menu item 420 is displayed. "Write for me" represents the use of the generative model to generate creative content. For example, the user requests the model to generate more information on a topic. "Real-time translation" represents the use of the generative model to corresponding translation content as the user enters text within the target application. An exemplary "Write for me" function will be described below with reference to FIG. 4C to FIG. 4H, and an exemplary "Real-time translation" function will be described with reference to FIG. 3F. It can be understood that the content creation tool may have more functions and is not limited thereto.

Figure 4C:
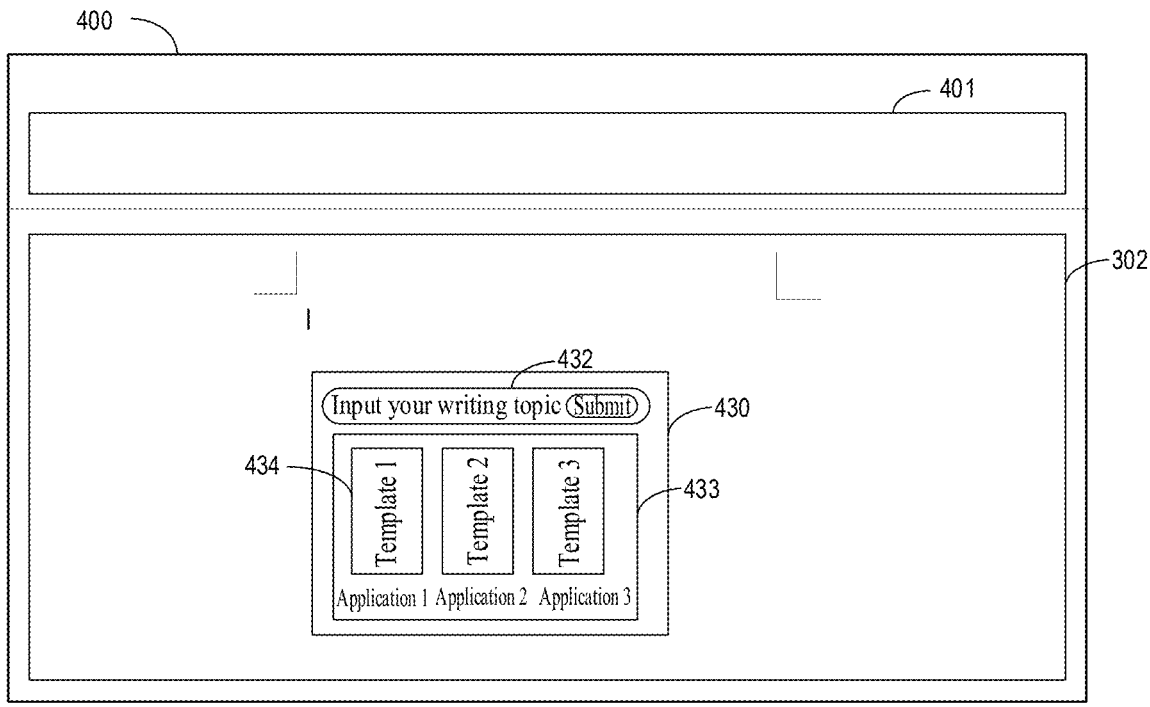

If the user selects either of the "Write for me" function or the "Real-time translation" function, the interface element of the content creation tool may be displayed, and the interface element may be displayed on top of a layer of the target application in the form of a floating window. FIG. 4C shows an interface element 430 displayed after the user selects the "Write for me" function, including an input area 432 and a template recommendation area 433.

In some embodiments, a prompt template may be used to generate a prompt to be provided to the model. Specifically, a prompt template to be used may be determined, and the user prompt may be added to the prompt template to obtain a prompt for the generative model. Then, the answer content generated by the generative model is obtained by providing the obtained prompt to the generative model. In this way, the user does not need to manually input all prompts, but only need to input an expected topic in a partially completed template. This can reduce an amount of user input. In addition, the use of the prompt template allows for obtaining content that better meets user expectations.

As mentioned above, the content creation tool can be associated with a plurality of editing applications, and different types of editing applications may have distinct characteristics for creative content. In some embodiments, a plurality of recommended prompt templates 434 may be displayed, with each prompt template associated with one editing application. As shown in FIG. 4C, Template 1 associated with Application 1, Template 2 associated with Application 2, and Template 3 associated with Application 3 are shown on the interface element 430. The user may select one of the templates to use.

In some embodiments, a prompt template recommended for use may also be determined based on a category label of a target application currently being used. Each category label may be mapped to one or more prompt templates. For example, a template of an office application may be a template for generating table content, a template of a picture-and-text application may be a template for generating a combination of a picture and text, and so on. In some implementations, the category label may be divided into several levels, i.e., a first-level label, a second-level label, etc., and a label at each level is mapped to one or more templates.

Figure 4D:
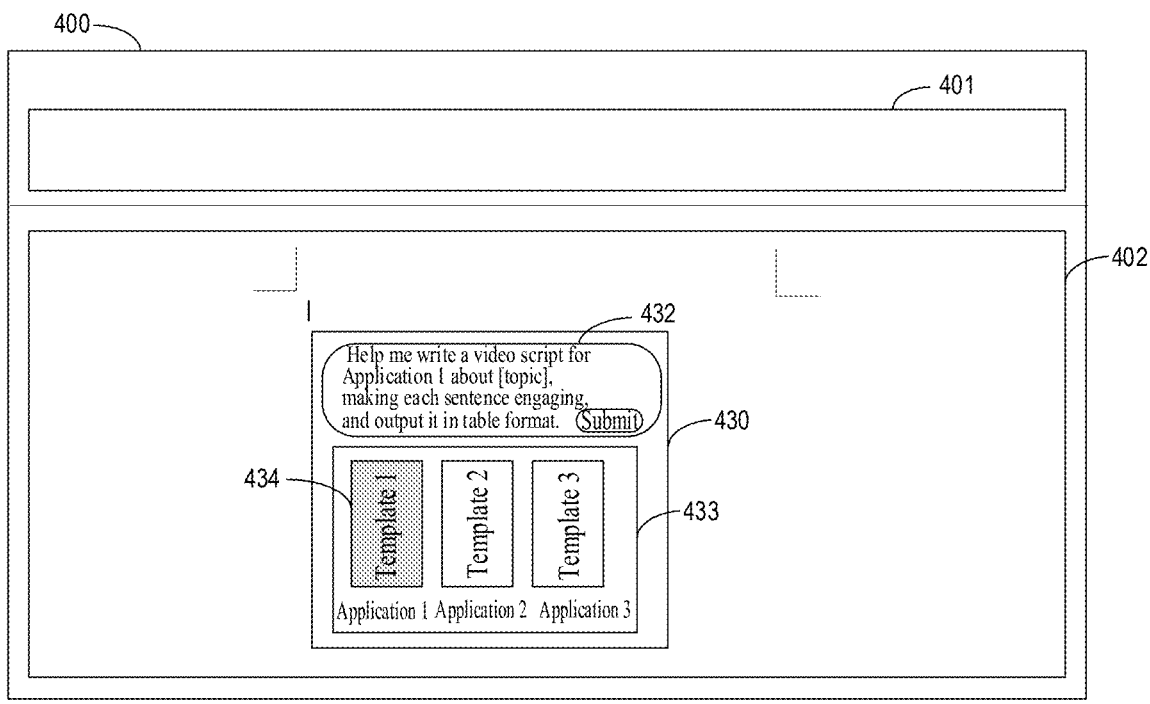

Referring to FIG. 4D, in response to the user manually selecting Template 1 or the content creation tool automatically selecting Template 1 associated with the current target application (i.e., Application 1), a predefined prompt of the template is automatically filled in the input area 432. As shown in FIG. 4D, content of Template 1 is: Help me write a video script for Application 1 about [Topic], making each sentence engaging, and output it in table format. At this time, the user only needs to manually fill in the content of [Topic]. Then, the user selects "Submit", and the complete prompt is input into the generative model. Accordingly, the content creation tool obtains answer content generated by the model.

Figure 4E:
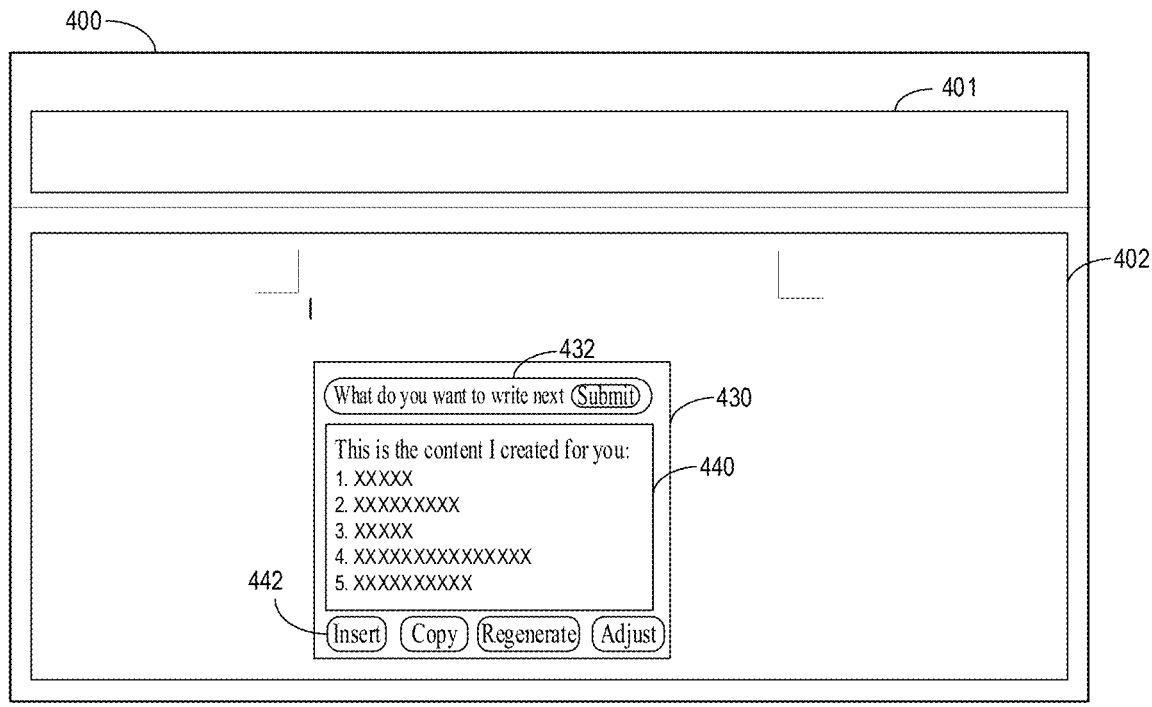

FIG. 4E shows an interface of submitting a prompt and obtaining answer content, where the interface includes an input area 432, which prompts the user whether to continue creating, a content area 440, which shows answer content generated by the generative model, and an operation area, including "Insert" 442, "Copy", "Regenerate", "Adjust", etc.

Figure 4F:
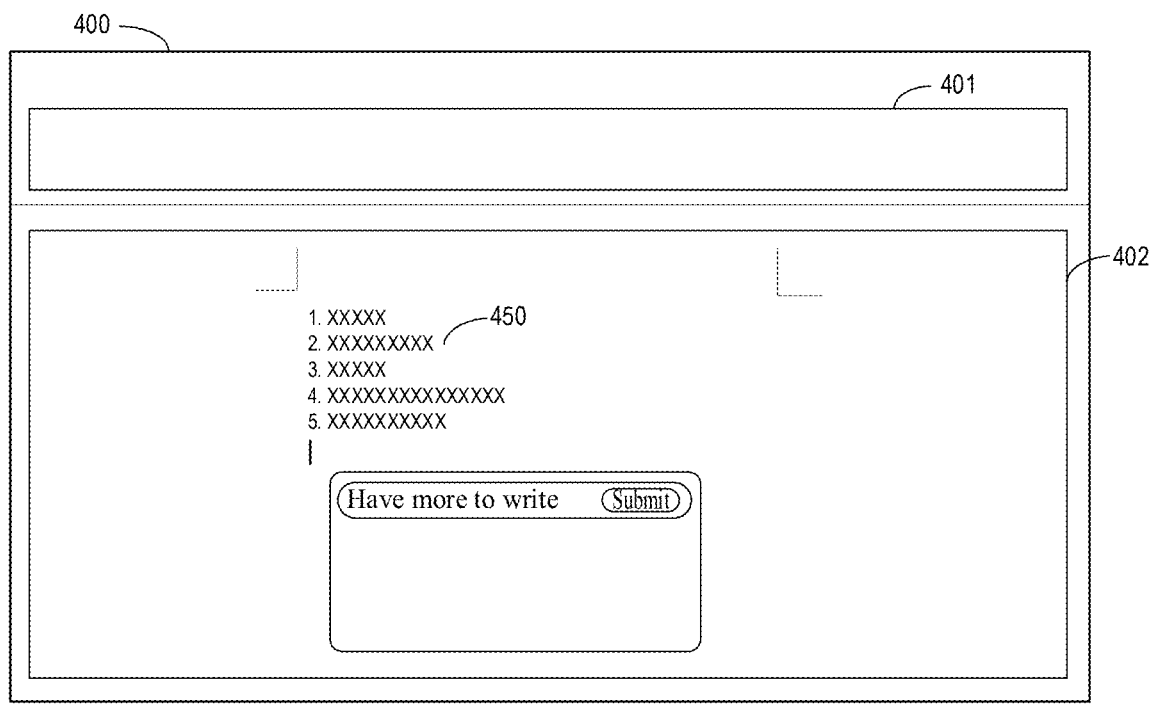

When the user clicks or touches "Insert" 442, the answer content in the content area 440 will be completely inserted into the target application. In some embodiments, the user may also click or touch "Adjust" to edit the answer content, and then click "Insert" to insert the edited content into the target application. In some embodiments, the answer content may be inserted into an editable area of the target application. As shown in FIG. 4F, content 450 generated by the model is inserted into an editable area 402 of the target application. Optionally, when the user triggers the content creation tool by selecting existing content, the answer content may also be inserted into a comment box corresponding to the content.

Figure 4G:
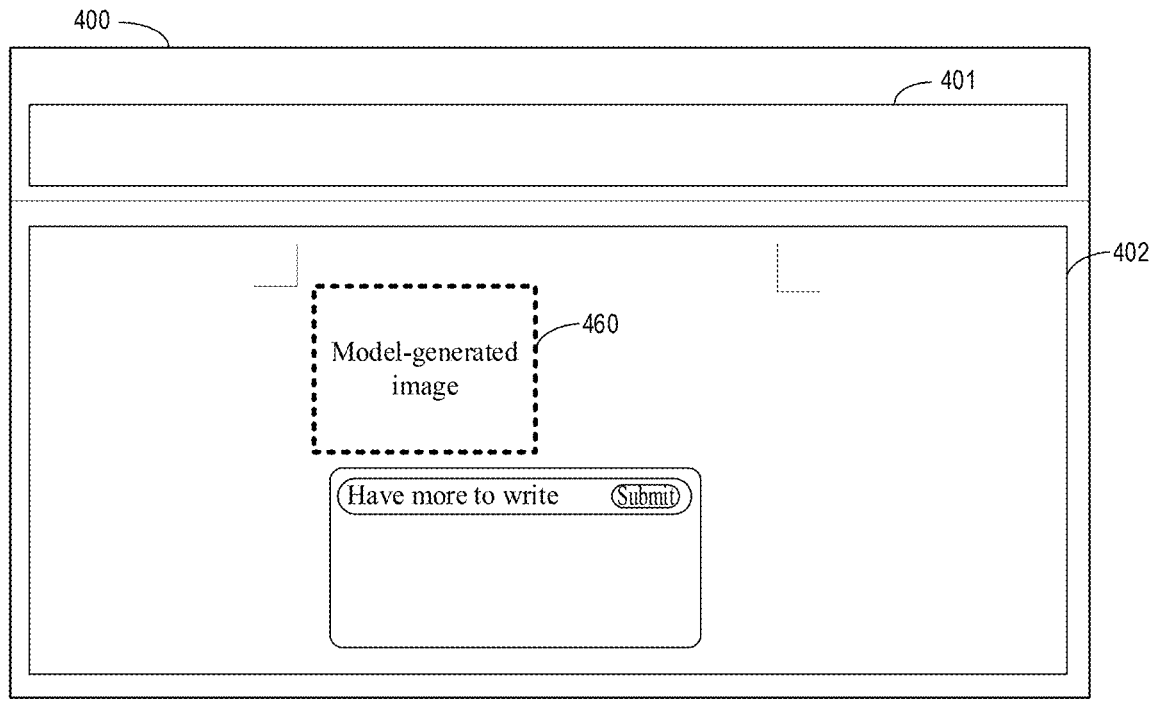
Figure 4H:
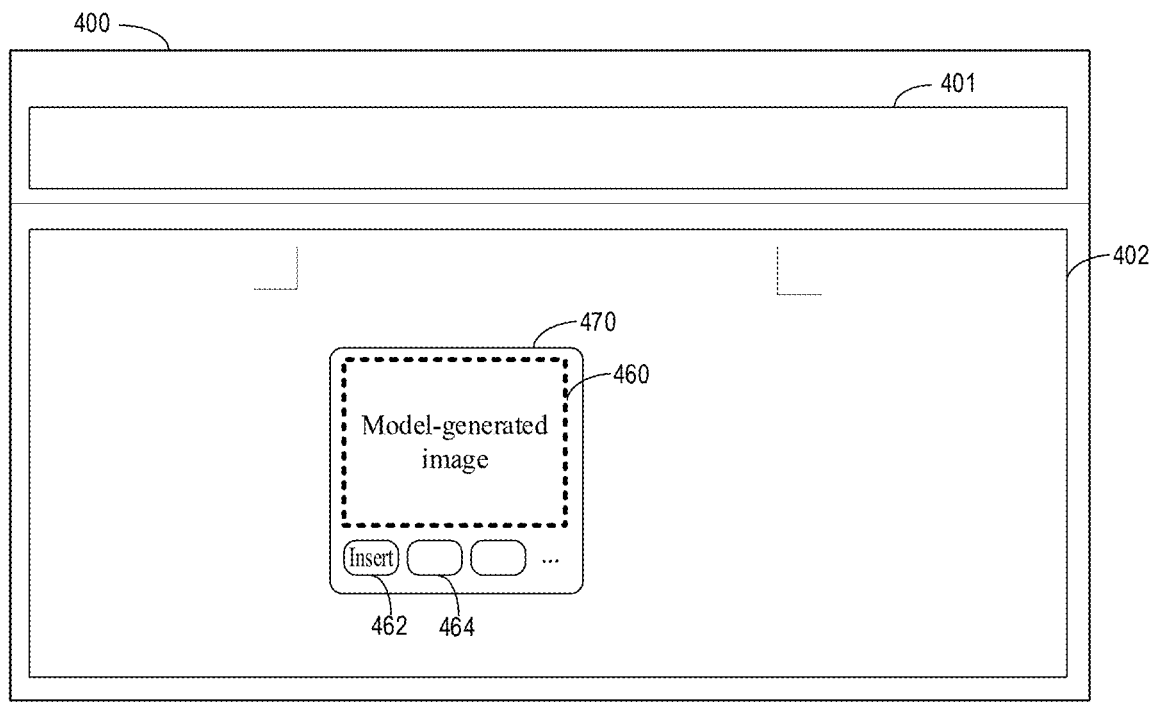

In some embodiments, a display position of the answer content may also be determined based on whether the target application has the capability to edit the generated answer content. That is, the answer content is directly inserted into the target application or is displayed in an overlay window. If the target application has the capability to edit the answer content, the answer content may be directly inserted into the target application; or if the target application does not have a capability to edit the answer content, the answer content is displayed in the overlay window. Taking an image format as an example, if a current application has an image editing capability and the generated content includes an image, the generated content may be displayed directly for the user to be able to edit directly in the current application. As shown in FIG. 4G, an image 460 generated by the model is directly inserted into the target application. If the current application is a consumer application, it may not have an editing capability. Therefore, it is necessary to display an overlay window first for the user to make subsequent modifications and edits, and after being confirmed, the content is displayed in the interface of the current application. As shown in FIG. 4H, the image 460 generated by the model is displayed in a floating window 470, and the floating window 470 further includes a control 462 for inserting an image into the target application and a control 464 for editing an image. The floating window 470 may be embedded into the interface element 430 of the content creation tool, or may be a separate floating window.

Figure 4I:
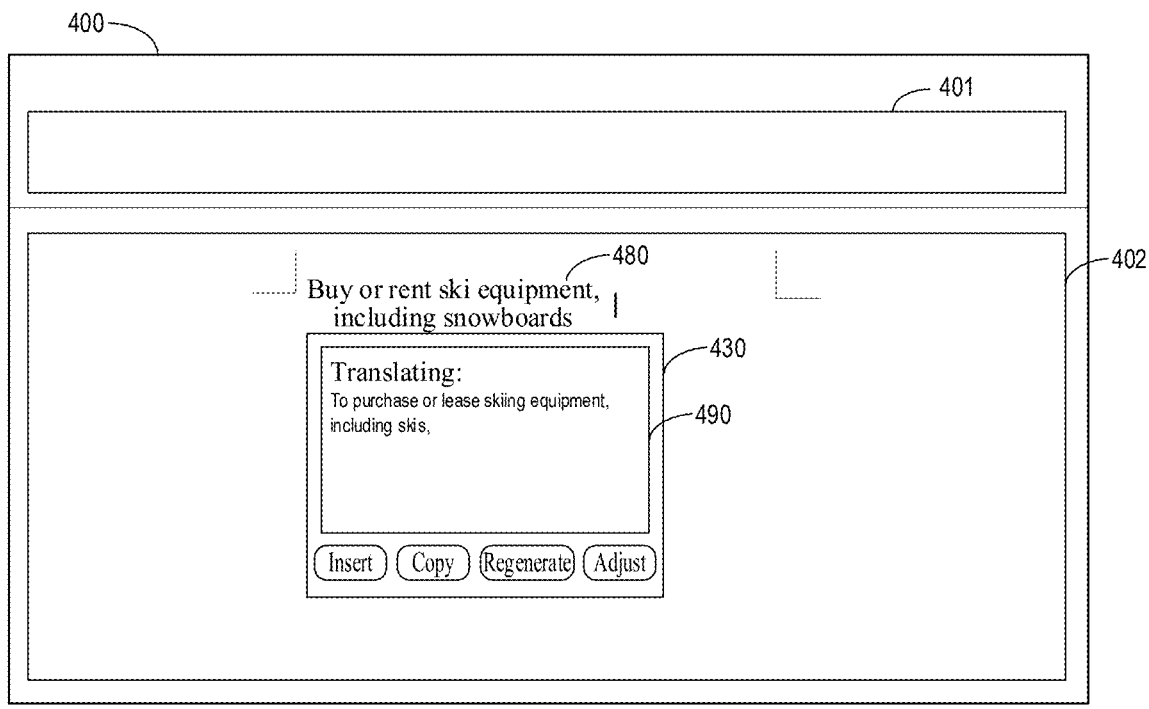

FIG. 4I shows a diagram of an interface of real-time content creation using the generative model according to an embodiment of the present disclosure. For example, when the user selects the "Real-time translation" menu item in the interface shown in FIG. 4B, the interface element of the content creation tool is presented as shown in FIG. 4I. In this case, answer content generated by the generative model may be displayed in real time in a content area 490 of the interface element 430 based on a user input 480 (i.e., a prompt) within the target application. It can be understood that the "Real-time translation" menu item corresponds to a hidden prompt template, which triggers the generative model to provide real-time translation content for the user input 480.

Figure 5:
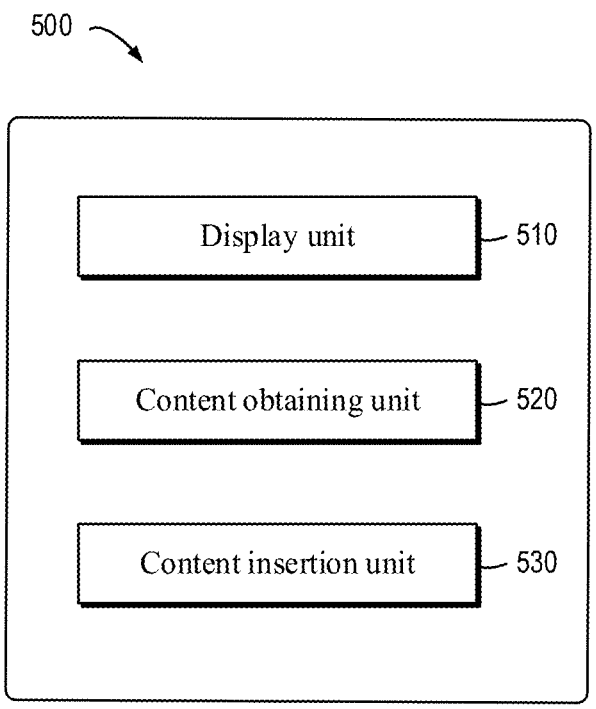
FIG. 5 is a schematic block diagram of an apparatus for content creation according to an embodiment of the present disclosure.

FIG. 5 is a schematic block diagram of an apparatus 500 for content creation according to an embodiment of the present disclosure. The apparatus 500 may be implemented by the computing device 100 shown in FIG. 1. As shown in FIG. 5, the apparatus 500 includes a display unit 510, a content obtaining unit 520, and a content insertion unit 530.

The display unit 510 is configured to display, during execution of an editing operation by a user within a target application, an interface element of a content creation tool for interacting with a generative model. The content obtaining unit 520 is configured to obtain, based on a user prompt received on the interface element, answer content generated by the generative model. The content insertion unit 530 is configured to insert the answer content into the target application.

It should be noted that more actions or steps described with reference to FIG. 1 to FIG. 4I may be implemented by the apparatus 500 shown in FIG. 5. For example, the apparatus 500 may include more modules or units to implement the actions or steps described above, or some units or modules shown in FIG. 5 may be further configured to implement the actions or steps described above. Repeated descriptions are not provided herein.

The technical solutions for assisting a user in content creation using a generative model according to the embodiments of the present disclosure are described above with reference to FIG. 1 to FIG. 5. Compared with conventional methods, the provided technical solutions are advantageous in that the user can invoke the window of the content creation tool at any time in various editing applications of the operating system, and use this tool to conveniently insert the content generated by the model into an editing application. In some embodiments, a creation template is automatically recommended within the window based on the current editing application of the user. After the user selects a suitable creation template or directly describes content the user wants to create, the generative model generates creative content, and the user can insert the content into the application with one click. This approach significantly improves the convenience and efficiency of using an AI tool by the user for content creation.

Some example implementations of the present disclosure are listed below.

According to a first aspect, a method for content creation is provided. The method includes: displaying, during execution of an editing operation by a user within a target application, an interface element of a content creation tool for interacting with a generative model; obtaining, based on a user prompt received on the interface element, answer content generated by the generative model; and inserting the answer content into the target application.

In some embodiments, the content creation tool is deployed at a level of an operating system having h a plurality of applications installed thereon, where the content creation tool is invokable in the plurality of applications.

In some embodiments, obtaining answer content generated by the generative model includes: determining a prompt template to be used; adding the user prompt to the prompt template to obtain a prompt for the generative model; and obtaining, by providing the prompt to the generative model, the answer content generated by the generative model.

In some embodiments, determining a prompt template to be used includes: determining, based on a category label of the target application, a prompt template associated with the category label as a prompt template recommended for use.

In some embodiments, determining a prompt template to be used includes: displaying a plurality of prompt templates, where the plurality of prompt templates include prompt templates respectively associated with a plurality of target applications; and determining, based on a user selection, one of the plurality of prompt templates as the prompt template to be used.

In some embodiments, the displaying an interface element of a content creation tool for interacting with a generative model includes: displaying, in response to the user intending to enter text or media content within the target application or in response to the user selecting text or media content within the target application, an icon or toolbar for invoking the content creation tool; and displaying the interface element based on a user input on the icon or toolbar, where the interface element includes a floating window.

In some embodiments, the interface element includes at least one of the following: an input area for inputting a prompt; a content area for displaying the answer content generated by the generative model; a toolbar for editing the answer content; and a control for inserting the answer content as a whole into the target application.

In some embodiments, the inserting the answer content into the target application further includes: determining whether the target application has the capability to edit the answer content; inserting the answer content directly into the target application in response to determining that the target application has the capability to edit the answer content; and displaying the answer content in an overlay window in response to determining that the target application does not have a capability to edit the answer content.

In some embodiments, the obtaining answer content generated by the generative model includes: displaying the answer content in the content area in real time based on a user input within the target application.

In some embodiments, the inserting the answer content into the target application includes: inserting the answer content into the target application in response to receiving an insertion indication, or inserting the answer content directly into the target application in response to obtaining the answer content.

In some embodiments, the inserting the answer content into the target application includes: inserting the answer content into an editable area or comment box of the target application.

In some embodiments, the method further includes: restricting the use of the content creation tool in the target application or operating system.

According to a second aspect, an apparatus for content creation is provided. The apparatus includes: a display unit configured to display, during execution of an editing operation by a user within a target application, an interface element of a content creation tool for interacting with a generative model; a content obtaining unit configured to obtain, based on a user prompt received on the interface element, answer content generated by the generative model; and a content insertion unit configured to insert the answer content into the target application.

According to a third aspect, an electronic device is provided. The electronic device includes: at least one processor; at least one memory, where the at least one memory is coupled to the at least one processor and stores instructions executable by the at least one processor, and the instructions, when executed by the at least one processor, cause the electronic device to: display, during execution of an editing operation by a user within a target application, an interface element of a content creation tool for interacting with a generative model; obtain, based on a user prompt received on the interface element, answer content generated by the generative model; and insert the answer content into the target application.

According to a fourth aspect, the present disclosure provides a computer-readable storage medium including machine-executable instructions that, when executed by a device, cause the device to perform the method according to the first aspect.

According to a fifth aspect, the present disclosure provides a computer program product tangibly stored on a non-transitory computer storage medium and including machine-executable instructions that, when executed by a device, cause the device to perform the method according to the first aspect.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip system (SOC), a complex programmable logic device (CPLD), and the like.

Program code used to implement the method of the present disclosure may be written in any combination of one or more programming languages. The program code may be provided to a processor or a controller of a general-purpose computer, a special-purpose computer, or another programmable data processing apparatus, such that when the program code is executed by the processor or the controller, functions/operations specified in the flowcharts and/or the block diagrams are implemented. The program code may be completely or partially executed on a machine, or may be executed as an independent software package partially on a machine and partially on a remote machine, or completely on a remote machine or a server.

In the context of the present disclosure, a machine-readable medium may be a non-transitory tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) (or a flash memory), an optic fiber, a portable compact disc read-only memory (CD-ROM), an optical storage device, a magnetic storage device, or any suitable combination thereof.

In addition, although the various operations are depicted in a specific order, it should be understood as requiring such operations to be performed in the specific order shown or in a sequential order, or requiring all illustrated operations to be performed to achieve desired results. Under certain circumstances, multitasking and parallel processing may be advantageous. Similarly, although several specific implementation details are included in the foregoing discussions, these details should not be construed as limiting the scope of the present disclosure. Some features that are described in the context of separate implementations can also be implemented in combination in a single implementation. In contrast, various features described in the context of a single implementation may alternatively be implemented in a plurality of implementations individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

We claim:

1. A method for content creation, comprising:
    displaying an icon on an interface of a target application, wherein the icon is configured to invoke a content creation tool, the content creation tool is associated with a plurality of applications, and the target application is among the plurality of applications;
    displaying, an interface element of the content creation tool for interacting with a generative model in response to the content creation tool being invoked;
    displaying, in the interface element, information indicative of associations between a plurality of prompt templates and the plurality of applications;
    generating a prompt based on a predefined prompt corresponding to one of the plurality of prompt templates that is associated with the target application;
    obtaining answer content generated by the generative model based on the prompt; and
    inserting the answer content into the target application.

2. The method according to claim 1, wherein the content creation tool is deployed at a level of an operating system having the plurality of applications installed thereon, wherein the content creation tool is invokable in the plurality of applications.

3. The method according to claim 1, wherein obtaining answer content generated by the generative model comprises:
   determining a prompt template to be used;
   adding a user prompt to the prompt template to obtain a prompt for the generative model; and
   obtaining, by providing the prompt to the generative model, the answer content generated by the generative model.

4. The method according to claim 3, wherein determining a prompt template to be used comprises:
   determining, based on a category label of the target application, a prompt template associated with the category label as a prompt template recommended for use.

5. The method according to claim 3, wherein determining a prompt template to be used comprises:
   displaying the plurality of prompt templates, wherein the plurality of prompt templates comprise prompt templates respectively associated with a plurality of target applications; and
   determining, based on a user selection, one of the plurality of prompt templates as the prompt template to be used.

6. The method according to claim 1, wherein the displaying an interface element of the content creation tool for interacting with a generative model comprises:
   displaying, in response to the user intending to enter text or media content within the target a application or in response to the user selecting text or media content within the target application, the icon or a toolbar for invoking the content creation tool; and
   displaying the interface element based on a user input on the icon or toolbar, wherein the interface element comprises a floating window.

7. The method according to claim 1, wherein the interface element comprises at least one of:
   a content area for displaying the answer content generated by the generative model;
   a toolbar for editing the answer content; or
   a control for inserting the answer content as a whole into the target application.

8. The method according to claim 7, wherein the inserting the answer content into the target application further comprises:
   determining whether the target application has a capability to edit the answer content;
   inserting the answer content directly into the target application in response to determining that the target application has the capability to edit the answer content; and
   displaying the answer content in an overlay window in response to determining that the target application does not have the capability to edit the answer content.

9. The method according to claim 7, wherein the obtaining answer content generated by the generative model comprises:
   displaying the answer content in the content area in real time based on a user input within the target application.

10. The method according to claim 1, wherein the inserting the answer content into the target application comprises:
    inserting the answer content into the target application in response to receiving an insertion indication, or
    inserting the answer content directly into the target application in response to obtaining the answer content.

11. The method according to claim 1, wherein the inserting the answer content into the target application comprises:
    inserting the answer content into an editable area or comment box of the target application.

12. The method according to claim 1, further comprising:
    restricting, through a a configurable approach, the use of the content creation tool in the target application or an operating system.

13. An electronic device, comprising:
    one or more processors; and
    a memory configured to store one or more programs, where the one or more programs, when executed by the one or more processors, cause the one or more processors to implement operations comprising:
    displaying an icon on an interface of a target application, wherein the icon is configured to invoke a content creation tool, the content creation tool is associated with a plurality of applications, and the target application is among the plurality of applications;
    displaying, an interface element of the content creation tool for interacting with a generative model in response to the content creation tool being invoked;
    displaying, in the interface element, information indicative of associations between a plurality of prompt templates and the plurality of applications;
    generating a prompt based on a predefined prompt corresponding to one of the plurality of prompt templates that is associated with the target application;
    obtaining, answer content generated by the generative model based on the prompt; and
    inserting the answer content into the target application.

14. The electronic device according to claim 13, wherein the content creation tool is deployed at a level of an operating system having the plurality of applications installed thereon, wherein the content creation tool is invokable in the plurality of applications.

15. The electronic device according to claim 13, wherein obtaining answer content generated by the generative model comprises:
    determining a prompt template to be used;
    adding a user prompt to the prompt template to obtain a prompt for the generative model; and
    obtaining, by providing the prompt to the generative model, the answer content generated by the generative model.

16. The electronic device according to claim 15, wherein determining a prompt template to be used comprises:
    determining, based on a category label of the target application, a prompt template associated with the category label as a prompt template recommended for use.

17. The electronic device according to claim 15, wherein determining a prompt template to be used comprises:
    displaying the plurality of prompt templates, wherein the plurality of prompt templates comprise prompt templates respectively associated with a plurality of target applications; and
    determining, based on a user selection, one of the plurality of prompt templates as the prompt template to be used.

18. The electronic device according to claim 13, wherein the displaying an interface element of the content creation tool for interacting with a generative model comprises:
    displaying, in response to the user intending to enter text or media content within the target a application or in response to the user selecting text or media content within the target application, the icon or a toolbar for invoking the content creation tool; and
    displaying the interface element based on a user input on the icon or toolbar, wherein the interface element comprises a floating window.

19. The electronic device according to claim 13, wherein the interface element comprises at least one of:
- a content area for displaying the answer content generated by the generative model;
- a toolbar for editing the answer content; or
- a control for inserting the answer content as a whole into the target application.

20. A non-transitory computer-readable storage medium having a computer program stored thereon, wherein the program, when executed by a processor of device, causes the device to perform operations comprising:
- displaying an icon on an interface of a target application, wherein the icon is configured to invoke a content creation tool, the content creation tool is associated with a plurality of applications, and the target application is among the plurality of applications;
- displaying, an interface element of the content creation tool for interacting with a generative model in response to the content creation tool being invoked;
- displaying, in the interface element, information indicative of associations between a plurality of prompt templates and the plurality of applications;
- generating a prompt based on a predefined prompt corresponding to one of the plurality of prompt templates that is associated with the target application;
- obtaining answer content generated by the generative model based on the prompt; and
- inserting the answer content into the target application.

\* \* \* \* \*